Nov. 27, 1956    J. I. YELLOTT ET AL    2,771,962
RECYCLING, PRESSURIZED VORTICAL WHIRL SEPARATOR, CONCENTRATOR
AND ASH STORAGE SYSTEM FOR POWDERED COAL-BURNING
GAS TURBINE POWER PLANTS
Filed Jan. 29, 1953    3 Sheets-Sheet 3
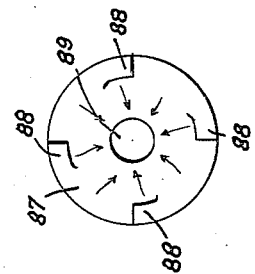
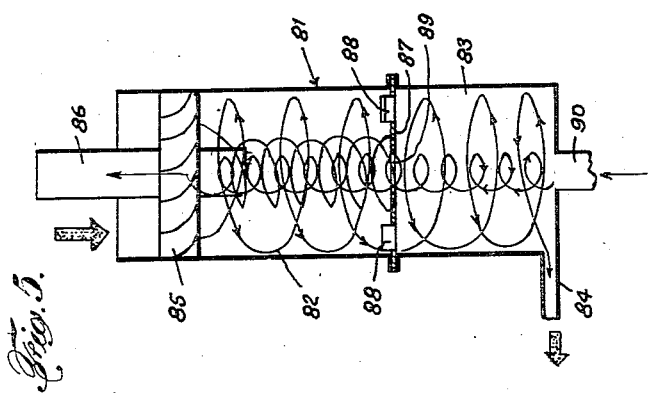
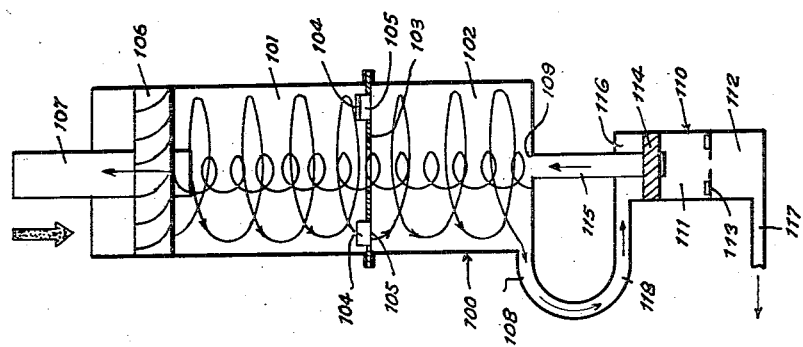
INVENTORS
John I. Yellott
Frederick D. Buckley
ATTORNEYS

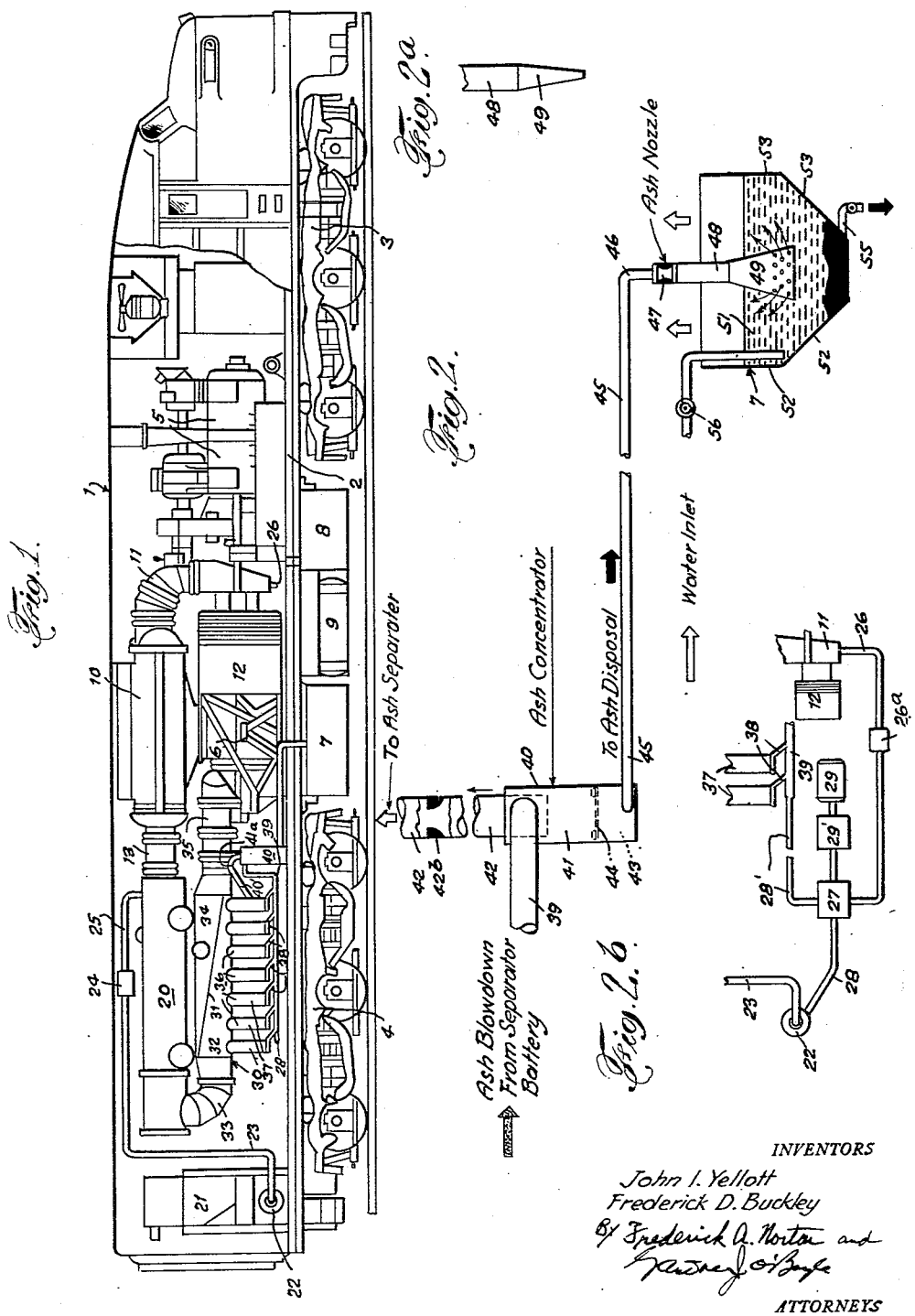

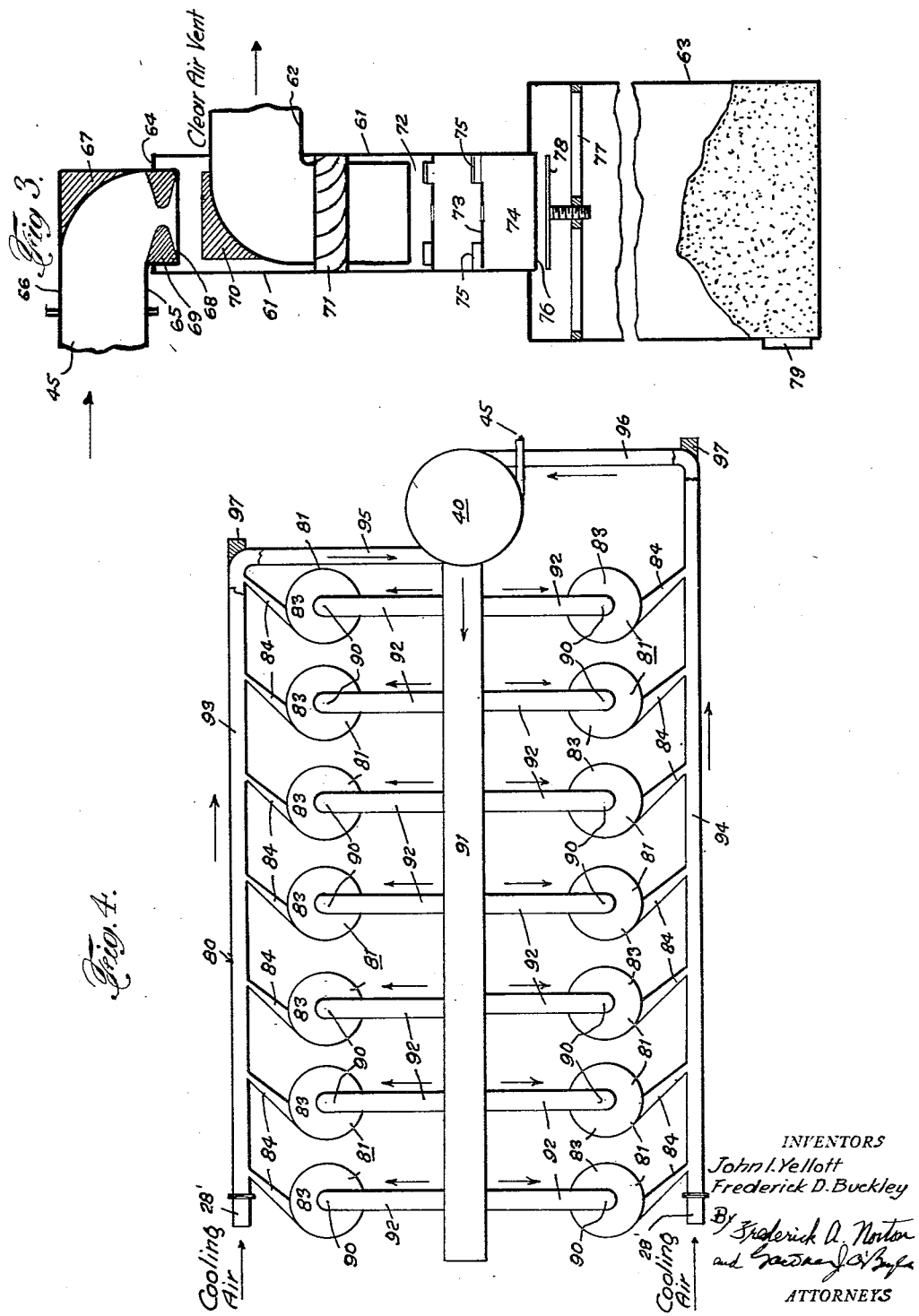

United States Patent Office 2,771,962
Patented Nov. 27, 1956

2,771,962

RECYCLING, PRESSURIZED VORTICAL WHIRL SEPARATOR, CONCENTRATOR AND ASH STORAGE SYSTEM FOR POWDERED COAL-BURNING GAS TURBINE POWER PLANTS

John I. Yellott, New York, and Frederick D. Buckley, Fredonia, N. Y., assignors to Bituminous Coal Research, Inc., Washington, D. C., a corporation of Delaware Application January 29, 1953, Serial No. 334,052

5 Claims. (Cl. 183—34)

This invention relates to improvements in power plants powered by a gas turbine whose motive fluid is generated by the pressurized combustion of a combustive air-borne streaming entrainment of ground coal of suitable particle size.

More particularly, the invention is concerned with the recovery of heat values from side streams of motive fluid used in blowdown lines of special ash separating equipment to carry off separated ash and other combustion residues.

In the companion application of John I. Yellott and Peter R. Broadley, Serial No. 330,076, filed January 7, 1953, for Generating Electric Locomotive With Coal-Burning Gas Turbine and Improved Coal Supply and Ash Removal Systems, there is disclosed and claimed a generating electric locomotive power plant utilizing powdered coal, and provided with special ash recovery and storage equipment. The present invention is essentially directed to improvements in the said system, wherein the cleaned gas recovered in the ash separating and storage equipment is returned to the power plant, with a resultant increase in the power cycle. The invention herein also includes the incorporation of special vortical whirl ash separators and ash concentrators in the ash handling system, whereby the dirty gas throughput is handled in equipment of appreciably reduced size, as compared with the equipment required in the system disclosed in the said Yellott and Broadley application.

The ash separating equipment disclosed herein is the result of continuing research with a locomotive power plant operated under actual locomotive operating conditions. The first, and most noteworthy fruit of this investigation was the development of a new type of vortical whirl separator, designated by the inventors as the "Dunlab" tube, and which is essentially discosed and claimed in the patent application of John I. Yellott and Peter R. Broadley, Ser. No. 257,702, filed November 23, 1951, for Vortical Whirl Separators and Method of Operation. Work with a full scale plastic model of the "Dunlab" tube, and under locomotive operating conditions (throughput of 1500 C. F. M. per tube of air loaded with varying amounts of pulverulent solids), shows that a considerable amount of fundamental research is necessary to arrive at an adequate explanation of the fluid mechanics of the system.

One development of the "Dunlab" tube which is of prime importance, is to make it pressure-sustaining, whereby individual tubes can function as pressurized ash-containing combustion gas separators, without the requirement of being housed in pressure-sustaining tanks or casings. The development of such tubes and their incorporation in powdered coal-burning motive fluid generators is more specifically disclosed and claimed in the companion application of John I. Yellott and Peter R. Broadley, Serial No. 330,077, filed January 7, 1953, for Coal-Burning Gas Turbine Power Plants Incorporating Novel Self-Supporting and Pressure-Sustaining Vortical Whirl Separators Together With Improved Ash Quenching and Blowdown Means.

The removal of any and all forms of entrained solids from stack gases of factories, locomotives, and other installations, has now become imperative, as a result of legislative action on air pollution and smoke control, and, also, as a result of increased appreciation of the fact that considerable economic waste results, as well as a continuing menace to public health. With the advent of systems for the pressurized combustion of pulverized coal and other fluent, residue-forming fuels, the problems of ash separation are compounded by the necessity of concomitantly quenching and removing incompletely combusted fuel particles, as well as removing and storing fine ash particles. In locomotive installations, it is impossible to vent or discharge combustion residues incorporating any significant amounts of fine ash particles, while the locomotive is in transit, as the fine ash is sucked under the wheels of the train, and gets into the bearings, acting as an abrasive, with the result that the bearing surfaces are quickly destroyed. Thus, apart from any sanitary regulations or considerations, for locomotive use, at least, all combustion residues from the pressurized combustion of powdered coal, or other residue-forming fuels, must not only be separated from the entraining gaseous products of combustion, and quenched, to prevent explosive combustion of incompletely burned fuel particles in the ash separating system, but must also be stored on the locomotive, in an innocuous condition, and discharged therefrom, at designated stations, usually in roundhouses during hostling of the locomotives.

The invention herein is particularly concerned with that portion of the combustion systems forming the subject matter of the applications, hereinabove identified, having to do with the concentration of the separated residues of combustion in a concentrated ash blowdown stream, followed by the quenching and storage of the separated residues, and the return of the cleaned gas from this final ash concentrating step to the ash separating system, whereby the overall amount of motive fluid required for the transport and removal of separated residues is appreciably reduced.

The desirable results of the present invention are secured, in part, by the recirculation of cleaned gas to a primary vortical whirl separator, and in part by the recirculation of cleaned gas from the ash concentration stage to the discharge stage of the vortical whirl separators comprising the primary ash separation stage, whereby the said separation and concentration stages are operated as substantially closed cycles, with motive fluid as the sole residue moving and carrying means, and the volume of motive fluid so used, and lost to the power units, is a minor fraction of one percent of the total throughput of motive fluid. The total elimination of mechanical ash-handling equipment is enhanced by the use of a minimum quantity of motive fluid, in cyclic flow, for the removal of the ash and other combustion residues from the system, and their delivery to a water quench and storage as a fluent slurry.

It is, therefore, among the features of novelty and advantage of the present invention to provide a novel mobile coal-burning gas turbine power plant with improved ash separation and storage systems.

It is also a feature of novelty and advantage to provide improved ash separation and storage systems for use with pressurized combustion systems using powdered coal or other combustion residue-forming fuels.

A further feature of novelty and advantage of the invention herein is the provision of closed circuit transportation of separated combustion residues by recirculating side streams of motive fluid.

Another feature of novelty and advantage of the invention herein is the provision of a coal-burning, gas turbine power plant of the character described, in which separated combustion residues are transported by recirculated side streams of motive fluid, and the concentrated residues are stored either as a water-borne slurry, or as a dry powder.

An additional feature of novelty and advantage of the invention herein is the provision of an ash separation and storage system for coal-burning gas turbine powers plants using powdered coal for generating motive fluid for the actuation of gas turbines, and characterized by the fact that separated ash is transported in two stages to a storage system by recirculating side stream of blowdown gas comprised essentially of motive fluid.

A special feature of novelty and advantage of the invention herein is the provision of vortical whirl separators of the "Dunlab" type having an axial cleaned gas return to the base of the discharge chamber.

Another special feature of the invention is the provision of an ash separator of the vortical whirl type having a discharge chamber with a tangential blowdown line for separated ash and an axial entrant for recycled cleaned gas from a succeeding ash concentrator of the vortical whirl type.

It is also a special feature of the invention to provide ash separating and concentrating equipment severally comprised of a battery of vortical whirl separators having ash blowdown lines discharging through common ash discharge manifold means to a unitary ash concentrator of the vortical whirl type, the cleaned gas from the concentrator being recycled to axial entrants in the bases of the discharge chambers of the separators.

Other special features of novelty and advantage of the invention herein include composite ash separator and concentrator in which the ash blowdown line of the separator serves as the input line of the concentrator, and the cleaned gas output line of the concentrator is directly coupled to an axial entrant in the base of the discharge chamber of the separator; vortical whirl ash concentrators having cleaned gas return lines to discharge chambers of primary separators, and concentrated ash blowdown lines coupled to ash quenching and storage equipment.

Additional special features of novelty and advantage of the invention herein include the provision of ash separating equipment comprised of a plurality of vortical whirl separators discharging cleaned gas to a common output and separated ash in gas-borne blowdown streams to a common ash concentrator of the vortical whirl type, the cleaned gas from the concentrator being recycled to the separators, and the concentrated ash being conveyed in a minimal gas blowdown stream to ash quenching and storage means.

With these and other features of novelty and advantage, which may be incident to the improvements herein, the invention consists in the parts and combinations to be hereinafter set forth and claimed, with the understanding that the several necessary elements comprising the invention, may be varied in construction, proportions and arrangements, without departing from the spirit and scope of the appended claims.

In order to make the invention more clearly understood, there is shown in the accompanying drawings means for carrying the same into practical effect, without limiting the improvements in their useful application to the particular constructions, which, for the purpose of explanation, have been made the subject of illustration.

In the drawings, like numerals refer to similar parts throughout the several views, of which—

Figure 1 is a schematic showing of a generating electric locomotive incorporating a powdered coal-burning gas turbine power plant for actuating the generators, an ash separating system including an ash concentrator with cleaned gas return to the ash separating system, and an ash blowdown line to an ash quenching and storage tank;

Fig. 2 is a schematic showing of an ash concentrator with blowdown line to a wet ash disposal unit and cleaned gas return to the ash separating system;

Fig. 2a is a fragmentary side elevation of a fish-tail diffuser nozzle of the wet ash disposal and storage unit of Fig. 2;

Fig. 2b is a fragmentary elevation of a pressure air system for supplying cooled, coal-carrying combustive air, and cooled blowdown air to the power plant of Fig. 1;

Fig. 3 is a vertical section through a storage unit adapted for the dry storage of air-quenched combustion residues;

Fig. 4 is a bottom plan view of the battery of reverse flow vortical whirl separators and associated ash concentrator, of Fig. 1, showing recycling return of cleaned gas from the ash concentrator to the axes of the bases of the discharge chambers of the individual separators of the battery;

Fig. 5 is a schematic vertical section of an improved reverse flow vortical whirl separator of type used in the battery of Fig. 4, and illustrating the flow of gas currents in the barrel and discharge sections of the separator;

Fig. 6 is a plan view of the axially apertured razor plate of the separator of Fig. 5, and illustrating the radial inflow of gases at the upper surface thereof, and Fig. 7 is a vertical section through a combination reverse flow vortical whirl separator and axially subjoined reverse flow vortical whirl ash concentrator, and illustrating the cyclic flow of the ash-carrying blowdown stream of motive fluid from the separator to the concentrator and its return as an inspirated axial stream of essentially cleaned blowdown gas.

Turning now to the drawings, the locomotive shown in Fig. 1, comprises a cab 1, mounted on a chassis 2, which is operatively supported on trucks 3, 4, and electrically driven by motors powered by generators 5, which are mechanically powered by gas turbine 6. Subjoined to and supported by the chassis are ash storage tank 7, water storage tank 8, and oil storage tank 9, whose functions will be severally considered more in detail hereinafter. The turbine exhaust stack 10 mounts regenerator tubes, not shown, in heat-exchanging relation with the exhaust gases, and which tubes are supplied with secondary air from discharge duct 11 of low pressure air compressor 12, driven by turbine 6. The regeneratively heated secondary cooling and diluting air discharges through one or more expansion ducts 13 into a like number of combustors, designated generally by the numeral 20. Usually, two combustors are used. A pulverized coal storage tank 21 and subjoined metering coal pump 22 are mounted adjacent the combustors, and coal is delivered from the pump into combustive air feed line 23, and thence through splitter 24 and combustor feed lines 25, to the combustors 20. The primary or high pressure combustive air is supplied to the coal pump in the following manner: A line 26 is tapped into the secondary air duct 11 (Fig. 2b), and supplies air to a combination constant volume pump and intercooler, designated generally by the numeral 27. The inter-cooler is connected to the metering coal pump 22 by line 28. The lines 28 and 23 are rectilinearly aligned in the pump 22, and respectively serve as combustive or primary air inlet and outlet lines, as more particularly set forth and claimed in the applications of John I. Yellott, Serial No. 361,802, filed June 15, 1953, for Improved Rotary Solids Transfer Pump for Handling Fluidized Solids (a division of U. S. Patent 2,650,675 of September 1, 1953, filed March 9, 1950), and Serial No. 363,524, filed June 23, 1953, for Rotary Solids Transfer Pump (a division of U. S. Patent 2,652,687, of September 22, 1953, filed November 30, 1949). A motor 29, powered by an auxiliary D. C. motor of the generator assembly 14, serves to drive the cooler-pump 27, and the speed of the motor may be controlled by any suitable control device, designated generally by the numeral 29'. A separately controlled branch line 28' serves to supply cooling blowdown air to the ash blowdown manifolds 39, 93, and 94 of the ash separating systems, to be described more in detail hereinafter.

The combustors 20 discharge ash and combustion residue-bearing combustion gases to the subjacent ash separator 30, through elbow ducts 33, and the cleaned gas from the separator is delivered to the turbine through expansion duct or ducts 35. The combustors are more particularly described and claimed in the application of one of us, Frederick D. Buckley, Ser. No. 257,165, filed November 19, 1951, for Cold Wall Combustor With Flexibly Mounted Flame Tube, and the novel vortical whirl separator assembly is more particularly described and claimed in the companion application of John I. Yellott and Peter R. Broadley, Serial No. 330,077, supra. The combustors are desirably of the improved type disclosed in the Buckley application, and include novel duplex coal-air and oil burners of the type disclosed and claimed in the application of Paul M. Rotzler, Ser. No. 257,079, filed November 19, 1951, for Powdered Coal Burner for Pressurized Combustors. The ash separator assembly 30 is comprised of a main, generally cylindrical conduit, divided longitudinally by a sloping separator plate 31 into a lower, dirty gas plenum chamber, 32, in fluid communication with the superjacent combustor through elbow duct 33, and an upper, cleaned gas plenum chamber 34, in fluid communication with turbine 6 through expansion duct 35. A battery of vortical whirl separators, designated generally by the numeral 36, is subjoined to, and the individual separators are severally in fluid communication with the dirty gas plenum chamber. The cleaned gas outlet tubes of the separators, not shown, connect the individual separators, severally designated by the numeral 37, with the cleaned gas plenum chamber 34. The ash blowdown lines of the separators are severally designated by the numeral 38, and jointly discharge into ash discharge manifold 39, which, in turn, discharges tangentially into the upper portion of ash concentrator 40. The manifold 39 may also discharge into the mouth of the concentrator through any suitable vortical whirl imparting means. As indicated in Fig. 2b, the manifold may be supplied with coolant air through line 28'.

The ash concentrator 40 is a vortical whirl separator of the same type as the self-supporting, pressure-sustaining vortical whirl separators 37, whose detailed construction and function is described and claimed in the above identified companion application of Yellott and Broadley, Serial No. 330,077. The ash concentrator is of appreciably smaller capacity (ca. $\frac{1}{10}$) than any of the main battery separators, and is designed to handle the combined ash-carrying blowdown streams from such separators. Thus, if there are ten (10) separators in a battery, and each one has a throughput capacity of 1500 C. F. M., with a blowdown stream of from 1½ up to 10 percent of the throughput, that is, from 22.5 to 150 C. F. M. per tube or separator, the total input of the ash concentrator will be 225 to 1500 C. F. M. of motive fluid, which fluid will carry at least 99.5 percent of the separated ash of the system. When this concentrated ash-carrying fluid is processed in the ash concentrator, it will be seen that the cleaned gas will be comprised of from about 200 to 1350 C. F. M. of the original dirty motive fluid, and the ash blowdown stream from the ash concentrator will vary from 22.5 to 150 C. F. M., which means that the total amount of original motive fluid required to remove the separated ash from the combustion system will vary between 0.001% and 0.01%, which is a highly efficient procedure, and noteworthy because of the fact that no extraneous mechanical equipment or power is made use of for ash handling and removal.

As shown in Fig. 2, the ash concentrator 40 includes the usual barrel section 41 having a vortical whirl-imparting entrant 39, previously described, an axial cleaned gas outlet 42 having its mouth depending well below the entrant into the primary separator chamber formed by the barrel 41, and a bottom discharge chamber 43, in fluid communication with the barrel section through an axially apertured razor plate 44 having upstruck peripheral skimmer blades defining peripheral apertures. A tangential ash blowdown line 45 connects the bottom of the discharge chamber wall with the ash disposal unit, designated generally by the numeral 7. As shown in Fig. 1, the cleaned gas return 40' of the ash concentrator 40, is provided with a goose neck connection 41a which may be connected to a coal drier system, not shown, or to the ash separator assembly, as will be described more in detail hereinafter. If the outlet 42 is connected to the coal drier system, it will be desirably provided with a flow restrictor 42b, such as an air nozzle, shown in Fig. 2, to maintain an appropriate working pressure in the ash separator system. The ash disposal blowdown line 45 discharges through a right-angle bend 46 and flow restrictor 47 into the inlet 48 of a perforated fishtail diffuser 49 which dips well below the surface of a body of water 51 contained in a semi-closed ash storage tank 7. The tank is provided with convergently sloping walls 52, 53, and a bottom 54 having a valved slurry outlet 55. Water is introduced into the tank through valved line 56 from water storage tank 8.

The tank, as indicated above is maintained at atmospheric pressure, by providing suitable splash guards, not shown, at the top, so that the residual cleaned gas of the ash separating system can be vented to the atmosphere. In operation, the concentrated ash blowdown stream from blowdown line 45 discharges through the diffuser into the body of water in the tank. Because of the characteristics of the flow reducer in the diffuser feed line, the pressure of the issuing gas stream is reduced to atmospheric, and its velocity is reduced to below 20 C. F. M. At this velocity, the gas stream will bubble through the apertures in the fish-tail diffuser at such a relatively slow speed that it will break gently into myriads of fine bubbles which will collapse at the surface of the water, and the particles of ash will be thoroughly wetted and fall to the bottom of the tank, where they will eventually build up into a fluent slurry which can be drained off through valved slurry outlet 55 when the locomotive is being hostled, or at any other suitable time.

By the improvements described immediately above, all ash is permanently and expeditiously removed from the turbine motive fluid, and stored, as a water-borne, fluent slurry, on the locomotive, from which it is discharged at approved points. If the ash nozzle and/or the diffuser become plugged, a clean-out plug, not shown, may be removed to permit access to the interior of the device.

While the preferred form of ash storage system for use with the invention herein is the wet slurry system, described above, and more particularly described and claimed in the Yellott and Broadley application Serial No. 330,076, hereinabove identified, the invention herein comprehends an alternative method of ash storage for use where wet storage is contraindicated.

Turning now to Fig. 3, there is shown, schematically, a dry ash quenching and storage system for use with the pressurized, powdered coal-burning combustion systems, referred to hereinabove. In this system, the ash delivered into the manifold 39 (Figs. 2 and 2b) in blowdown streams of hot (ca. 1350° F.) motive fluid is quenched by contact with coolant air introduced through line 28' (Fig. 2b). The amount of coolant air used is, desirably, at least equal to the amount of air required to transport the concentrated ash from the ash concentrator to the final ash disposal unit. Under such circumstances, the ash concentrator will return an equivalent amount of cleaned gas to the ash separation system, in cyclic flow, so that there will be substantially no motive fluid removed from the power system. In any event, any loss of motive fluid from the ash handling system will be reduced to an absolute minimum. Under the circumstances obtaining immediately above, the ash concentrator will deliver a cooled, concentrated ash blowdown stream through blowdown line 45 to the dry ash disposal unit of Fig. 3. The unburned combustible particles in this stream will be air-quenched or cooled below the danger point (ca. 400 F.). The dry ash quenching and disposal system, as shown, is comprised of a special reverse flow vortical whirl separator 61, having a cleaned gas return 62, and a subjoined ash storage chamber 63. The separator 61 is an elongated cylindrical member having a closed top 64 in which is received a special right angle coupling 65. This member has a flanged inlet 66, hermetically coupled to ash disposal line 45; an abrasion resistant, replaceable plug 67, of boron carbide, or equivalent abrasion resistant material; and a discharge outlet 68 hermetically embouched in the closed top 64. The outlet 68 incorporates a convergent flow restrictor nozzle 69, also of abrasion resistant material. The inner surface of plug 67 is curviform, as shown in Fig. 3, and serves as a conjoint impact surface and deflector, whereby coarse particles carried in the gas stream delivered through concentrated ash blown in line 45 are projected thereagainst and reduced in particle size, and the gas stream is deflected downwardly through the flow restrictor 69 into the fore chamber formed in the upper part of closed cylinder 61. An impact member 70, of abrasion resisting material, such as boron carbide, or the like, is secured on the upper surface of the elbow bend of cleaned gas return 62, with its upper, flat surface, in juxtaposition to the discharge axis of nozzle 69, and receives the particles projected therefrom at high velocity in the newly expanded gas stream whose pressure is now slightly above atmospheric. The member 70 serves to reduce impacted particles to a finer state of division, and the resulting gas-borne dispersion is flowed through vortical whirl-imparting vanes 71, into the upper or primary separator chamber 72 of separator 61. The vanes 71 have a delivery angle of substantially 30°, and serve to spacedly mount the depending inlet section of cleaned gas return 62 axially in the cylinder. An axially apertured plate 73 divides cylinder 61 into an upper separator chamber 72 and a lower discharge chamber 74, in the ratio of substantially 2 to 1. The plate 73 is provided with upstruck skimmer blades, 75, desirably set at an angle of about 30°, and defining radially disposed peripheral apertures establishing fluid communication between the chambers, together with the axial aperture in the plate. The open bottom 76 of cylindrical casing 61 is hermetically embouched in the closed top of the subjoined dry ash storage chamber 63. A supporting spider 77 is mounted in the upper part of the storage chamber 63 and adjustably mounts a vortex reflector comprising a circular disk 78 in any predetermined spaced relation with the bottom 76 of the discharge chamber 74. The vortex reflector and its principle of operation are described and claimed in Yellott and Broadley application, Serial No. 257,702, supra. Disk 78 is equiradial with cylinder 61, and its periphery establishes an annular discharge slot with the bottom edge 76 of the discharge chamber. Because the periphery of disk 78 is equiradial with the outer surface of cylinder 61, all concentrated ash blown down from the discharge chamber 74 into the storage chamber 63 will follow a flat, spinning path through the annular discharge slot, so that the flow will be essentially tangential to the outer surface of the cylinder 61 and to the bottom of discharge chamber 74. A discharge port 79 is provided in the bottom of the wall of storage chamber 63, and is provided with any suitable removable closure.

The dry ash storage system 60, described immediately above, is particularly adapted for use with the ash separation systems of the present invention, as well as those of the patent applications referred to hereinabove. Because the relatively small volume of cleaned air discharged from the storage system is at substantially atmospheric pressure, and the storage chamber has but a relatively narrow annular slot as an entrant, there can be no effective stirring up of deposited ash in the storage chamber, and return thereof to the discharge chamber 74. The cleaned gas discharged through vent 62 will have a very low velocity, so that there will be no entrainment of ash to be discharged to the atmosphere.

The wet and dry ash storage systems, described hereinabove, will make possible the operation of cool-burning locomotives under all circumstances, even including operation within city limits, where the discharge of smoke into the atmosphere is prohibited by state law or municipal ordinance. Aside from all considerations of legal restraint, the novel disposal systems herein make for improved and economical train operation, in that all deleterious action of abrasive ash particles and other solid combustion residues on the surface of cars, and in and on bearing surfaces of the wheels and trucks, is completely eliminated. These desirable results, coupled with the fact that ash disposal, as taught herein, requires no mechanically operated equipment, makes for the utmost simplicity and economy in power plant operation, and particularly in the operation of self-powered motive equipment for railroads. Where the power plants are incorporated in stationary units, the separated and stored ash can be flushed to disposal pits, or concrete mixers, to serve as filler material, or the dry ash can be air borne to any suitable use, as in concrete mixing or the manufacture of building blocks. The fine ash is specially adapted for a number of industrial purposes, as indicated above.

In the continuing research looking to the most economical utilization of space, equipment, and fuel in locomotive and other power plants, a key factor was very early determined to be the ash separating and storage equipment. In the patents and patent applications, referred to herein above, the progressive development of respectively improved systems of separation and storage has been carefully documented. The discovery that the "Dunlab" tube (disclosed and claimed in Yellott and Broadley application, Ser. No. 257,702, for Vortical Whirl Separators and Method of Operation, supra) had a pronouncedly different and more efficient separation performance than other vortical whirl separators available on the market, or described in the literature, led to a detailed research to determine the characteristics of this device, and the possibilities of its integration into improved powdered coal-burning power plants, of the pressurized combustion type.

It was soon found that the "Dunlab" tube markedly improved the ash separation efficiency of any powdered coal-burning, pressurized combustion system in which it was integrated. As noted in the Yellott and Broadley application, identified immediately above, the tornado or hurricane action of the helically streaming, particle-bearing gas streams of hot motive gas resulted, inter alia, in the formation of an axial aperture in the base of the discharge chamber. This effect was due to the abrasive action of the center of the dynamic particle-bearing gas torus obtaining in the chamber, whereby the radially inward flowing, particle-charged gases, are concentrated at the axis or center of the base of the chamber, and function in the same manner as the "eye" of a hurricane. The discovery that the flow of gases at this point followed the action of the "eye" of a tornado or hurricane, in all essential points, gave rise to a new understanding of the basic laws governing the operation of vortical whirl separators. Just as in a tornado or hurricane, where the updraft of the axially upflowing "eye" is powerful enough to uproot and transport buildings, trees, and other articles, even for great distances, it has been found that the axially upflowing, particle-charged stream of the discharge chamber of the vortical whirl separator, known as the "Dunlab" tube, exerts a powerful suction or updraft, in its flow upward and through the axial aperture of the separator plate, dividing the discharge chamber from the superjacent barrel or primary separator chamber.

In the invention herein, the powerful suction of the axial updraft of the fine particle-charged gases in the discharge chamber of a novel vortical whirl separator of the "Dunlab" type, is made use of to improve the functioning of a succeeding ash concentrator, also, and desirably, of the "Dunlab" type, and to effect a recycling of the gaseous motive fluid quantum serving as a blowdown gas for the entrainment of separated residues tangentially discharged from the bottom periphery of the discharge chamber. An ash separator system incorporating the above indicated principles, and including a battery of "Dunlab" type vortical whirl separators, is illustrated in Figs. 4, 5, and 6, and a self-contained unit is schematically shown in Fig. 7.

As indicated in Fig. 1, the cleaned gas discharged from the ash concentrator 40 is returned to the ash separator battery 80, shown in bottom plan in Fig. 4. This battery is comprised of two parallel rows of modified "Dunlab" tube type vortical whirl separators, severally designated by the numeral 81, and shown more in detail in Figs. 5 and 6. Turning to these figures of the drawings, the modified tubes 81 will be seen to severally comprise the usual barrel or primary separator section 82, and a subjoined discharge chamber 83 having a restricted flow, tangential discharge or blowdown line 84. The mouth of the tube 81 is provided with vortical whirl-imparting means 85, comprising a vaned collar, which also serves as a mounting for axially disposed cleaned gas discharge tube 86. A separator plate 87 divides the tube 81 into the barrel section 82 and the discharge chamber 83, and establishes peripheral and axial fluid communication therebetween by means of peripheral apertures defined by upstruck peripheral blades 88, and axial aperture 89. An axial entrant 90 is formed in the bottom of the discharge chamber. As previously disclosed, and repeated here by way of emphasis, the inflowing dirty gas passing through the vanes of vortical whirl-imparting means 85 is caused to flow, in a vortical spin, against the inner wall of the chamber 82, the coarser particles of entrained solids being projected against the said wall. At the bottom of the chamber the peripherally flowing gas and entrained solids are diverted into the subjoined discharge chamber by the upstruck peripheral blades 88, and the main body of the gas, minus the discharged coarse particles, flows radially inward towards the axial center of the chamber, along the upper surface of separator plate 87, as graphically illustrated trated in Fig. 6. The axially returned gas flows upward in the chamber, still spinning and radially discharging contained solid particles, until it discharges, as a substantially cleaned gas stream, through cleaned gas outlet 86. The radially discharged particles are entrained in the down-flowing peripheral vortical stream of raw, dirty gas, and carried into the discharge chamber 83.

In the discharge chamber 83, the still spinning stream of motive fluid from chamber 82 sets up a toroidal flow downwardly in contact with the wall of the chamber, to the bottom, where a portion of the motive fluid discharges through the tangential blowdown line 84, entraining separated solids therein. The major portion of the spinning gas stream, containing residual fine particles, then spins radially inward along the bottom of the chamber, and in a tightening spiral, to the axis of the chamber, where, as above indicated, it exerts a powerful suction, caused by its upflow to the axial opening or breather hole 89 of separator plate 87. In its upflow the gas stream expands radially outward, particularly along the bottom of separator plate 87, so that a major portion of the entrained fine solids are projected radially outward to be entrained in the down-flowing peripheral stream, and a true toroidal flow of the motive fluid is established in the chamber. This portion of the upflowing gas stream which passes through axial aperture 89 will expand in the bottom of chamber 82 and project contained particles to the periphery of the chamber, while the now substantially cleaned core of gas, will flow upward and mingle with the cleaned gas stream. The cleaned gas stream from the ash concentrator will be inspirated through line 90 into the chamber 83 by the powerful suction action of the "eye" or upstreaming core of the toroidal or cyclonically flowing gas stream, and will be returned to the ash separating system to be recycled, at least in part, to the ash concentrator 40. It will be seen that due to the suction imposed upon the cleaned gas line 90, a negative pressure gradient will be established in the ash blowdown line 84, and ash concentrator 40, thereby increasing the efficiency of ash removal from the primary separator, as well as from the ash concentrator, and permitting the handling and transport of separated ash and other residues of combustion, in an autogenous manner, that is, without the introduction of any extraneous transporting medium or equipment of any nature whatsoever. Stated in other words, the novel ash separation and concentration systems herein, with the positive recycling of motive fluid used as blowdown streams for the transport of separated ash and other combustion residues, are self-purging, and eliminate the necessity for the expenditure of extraneously derived energy of any kind for the removal of separated solids from pressurized combustion systems using residue-forming fuels.

Turning now to Fig. 4, the novel ash separator battery 80, is shown in bottom plan view as recyclically coupled to an ash concentrator 40 having the usual concentrated ash disposal or blowdown line 45. The cleaned gas outlet line 42 of the ash concentrator (Fig. 1) is coupled to a central manifold 91 through connecting line 42a. The manifold 91 discharges recycled gas to the subjoined axial entrants 90 of individual separators 81, through branch lines, designated generally by the numeral 92. The separator units 81 are severally embouched in an ash separator conduit of the type shown in Fig. 1, and designated generally by the numeral 30. The vortical whirl separator units 81 are similar in construction and function to the "Dunlab" tube units 37 of Fig. 1, with the important modification of the subjoined cleaned gas return 90. Both forms of the "Dunlab" tube disclosed herein are pressure-sustaining and self-supporting, as more fully set forth and claimed in the Yellott and Broadley application Serial No. 330,077, supra. Any desired number of individual separators 81, may be made use of in a battery, care being taken to balance the units, as shown in Fig. 4, and to couple the flow restrictor-containing tangential blowdown lines 84 from the several discharge chambers 83 to the common ash concentrator 40 through parallel manifolds 93, 94, severally discharging into tangential feed lines 95, 96, of the ash concentrator. The elbows connecting the manifolds 93, 94, and the feed lines 95, 96, may be provided with impact plugs, designated generally by the numeral 97, and conforming generally to element 67, shown in Fig. 3. Cooling air feed lines 28' are desirably coupled to the parallel manifolds, as shown, to insure air quenching of the unburned combustibles entrained in the consolidated blowdown streams of separated combustion residues delivered to the ash concentrator, and thence to the ash disposal units of either of Figs. 2 and 3.

With the use of the recycling motive fluid ash carrying system of Figs. 4–6, coupled with the input of compressed coolant air from the system of Fig. 2b, it will be appreciated that the power plants herein can be operated without the loss of any ash-entraining motive fluid, as this motive fluid is cleaned and returned to the system, and the quantum of ash-carrying motive fluid used for the original ash blowdown streams can be wholly replaced by added coolant air, which, in effect serves to transport separated ash to the ash concentrator, and thence to the ash disposal system. The coolant air is provided by pumps driven by motors powered by auxiliary D. C. generators of the power plant, so that, as above noted, the powdered coal-burning power plants herein are wholly self-contained, and require no extraneous supplies of energy, whether fluid, electrical, or mechanical.

While the features of novelty and advantage of the invention herein have been described with particular reference to the use of an ash separating system incorporating a plurality of "Dunlab" type vortical whirl separators, with or without the special recycling of cleaned gas from the ash concentrator to the separator battery, the invention also comprehends the use of an essentially self-contained ash separator-concentrator unit being a further elaboration of the recycling systems described above. Such a unitary system is illustrated in the schematic showing of Fig. 7. As there shown, a conjoint ash separating and concentrating device, designated generally by the numeral 100, is comprised of the following elements: a "Dunlab" type reverse flow vortical whirl ash separator having a barrel section 101 with a subjoined discharge section 102 and an interposed, axially apertured razor plate 103 with upstruck peripheral blades 104 defining peripheral apertures 105 establishing fluid communication between sections 101 and 102; a vortical whirl-imparting dirty gas inlet comprising peripherally mounted vanes 106; an axial cleaned gas outlet tube 107; a tangential blowdown line 108 at the base of the discharge section, and an axial entrant or orifice 109 in the said base; a subjacent "Dunlab" tube ash concentrator 110 comprised of a barrel section 111, a discharge section 112, an interposed, peripherally and axially apertured razor plate 113, vortical whirl-imparting vaned dirty gas inlet means 114, axially disposed cleaned gas discharge tube 115, closed inlet plenum chamber 116, tangential concentrated ash blowdown line 117, and line 118 connecting the first blowdown line 108 with the closed inlet plenum chamber 116. The special feature of this novel construction, aside from the greatly reduced size of the ash concentrator 110, is the embouchement of the cleaned gas discharge tube 115 of the concentrator in the axial entrant or orifice 109 of the discharge section 102 of the superjacent ash separator.

The apparatus described immediately above is most simple in construction and economical in operation, as well as saving in space. The direct return of cleaned gas from the ash concentrator to the axis of the discharge section of the ash separator makes available the full suction power of the updraft of the axis or "eye" of the toroidally cycling gas stream in the discharge section. This particular assembly is of particular utility in cases where a battery of the improved "Dunlab" type vortical whirl separators cannot be used, whether because of limited throughput of gas to be cleaned, or because of space limitations, and the use of a single, possibly oversize, ash separator is indicated. The concentrated ash blowdown line 117 may be suitably connected to the input of any of the ash disposal and storage systems described hereinabove, preference being given to the wet storage system.

There has been described and illustrated a system and component elements thereof capable of performing all of the specifically mentioned features of novelty and advantage of the present invention, as well as others which are apparent to those skilled in the art. Various uses of the present invention may be made employing the described structures in their conjoint, cooperative assembly. Accordingly, it is apparent that variations as to operation, size and shape, and rearrangement of the elements may be made without departing from the spirit of the invention. Therefore, limitation is sought only in accordance with the scope of the following claims.

What is claimed is:

1. Recycling separator, concentrator and storage system of the character described, comprising, in combination, a source of pressurized particle-bearing gasiform fluids; a first separating means coupled to said source, and including at least one reverse-flow vortical whirl separator having an axially apertured bottom; a tangential blowdown line for blowdown fluid-borne separated particles adjacent to the bottom; an ash concentrator comprising a second reverse flow vortical whirl separator, of lesser capacity than said first separating means coupled to the first said blowdown line; duct means for recycling cleaned gas from said ash concentrator to the bottom axial aperture of the first separator; a second blowdown line discharging concentrated separated particles in a blowdown stream of gas from the ash concentrator; and means for receiving and storing the said concentrated blowdown residues.

2. Recycling separator, concentrator and storage system according to claim 1, characterized by the fact that a battery of reverse flow, vortical whirl separators is used in the first separating stage, and that common manifolds are provided for blowdown gas from the separators of the first separating stage and for the cleaned gas from the ash concentrator.

3. Separator and storage system for the separation of solid particles carried as streaming entrainments of discrete particles in pressurized gasiform fluids, comprising, in combination, a source of solid particle-bearing gasiform fluid; a first separating means connected to said source, and comprising a battery of reverse flow vortical whirl separators, each said separator having a cylindrical barrel section and an axially apertured bottom; the said separators severally incorporating tangential blowdown lines for blowdown gas-borne separated solid particles at the bases of the separators, said blowdown lines severally incorporating flow restrictors and jointly discharging into a common manifold; an ash concentrator coupled to the output of said manifold; duct means for recycling cleaned gas from said ash concentrator to a second, cleaned gas manifold; duct means coupling said second manifold to the axial apertures in the bottoms of the separators of said battery; a blowdown line discharging separated particles in a blowdown stream from said ash concentrator, said blowdown line incorporating a flow restrictor; and storage means coupled to said blowdown line.

4. Separator and storage system according to claim 3, characterized by the fact that the ash concentrator blowdown line incorporates a fish-tail type distributor at the end thereof, and the storage means comprises a quenching and separated solids storage tank containing water, the distributor being mounted in the tank, below the water level, whereby the blowdown gas-borne concentrated solids discharged through the distributor are quenched and dispersed in the water to form a slurry, and the cleaned gas is discharged to the atmosphere.

5. Separator and storage system according to claim 4, characterized by the fact that the concentrated solids blowdown line incorporates a convergent nozzle type flow restrictor and pressure reducer.

References Cited in the file of this patent

UNITED STATES PATENTS

| 1,856,685 | Anderson | May 3, 1932 |
| --- | --- | --- |
| 2,167,839 | Henderson et al. | Aug. 1, 1939 |
| 2,391,863 | Bowen | Jan. 1, 1946 |
| 2,424,122 | Schneider | July 15, 1947 |
| 2,515,894 | Polk | July 18, 1950 |
| 2,525,490 | Kerr et al. | Oct. 10, 1950 |
| 2,533,866 | Yellott | Dec. 12, 1950 |
| 2,582,423 | Foley | Jan. 15, 1952 |

FOREIGN PATENTS

| 580,936 | Great Britain | Sept. 25, 1946 |
| --- | --- | --- |
| 684,180 | Germany | Nov. 23, 1939 |